United States Patent
Kieslinger et al.

(10) Patent No.: US 9,879,837 B2
(45) Date of Patent: Jan. 30, 2018

(54) OPTICAL STRUCTURE FOR SIGNAL LIGHT

(71) Applicant: ZIZALA LICHTSYSTEME GMBH, Wieselburg (AT)

(72) Inventors: Dietmar Kieslinger, Theresienfeld (AT); Josef Pürstinger, Wieselburg (AT); Markus Danner, Ollersdorf (AT)

(73) Assignee: ZKW GROUP GMBH, Wieselburg an der Erlauf (AT)

( * ) Notice: Subject to any disclaimer, the term of this patent is extended or adjusted under 35 U.S.C. 154(b) by 0 days.

(21) Appl. No.: 15/143,841

(22) Filed: May 2, 2016

(65) Prior Publication Data
US 2016/0327230 A1    Nov. 10, 2016

(30) Foreign Application Priority Data

May 4, 2015    (EP) .................................... 15166297

(51) Int. Cl.
*F21V 5/00*    (2015.01)
*F21S 8/10*    (2006.01)
*G02B 5/02*    (2006.01)

(52) U.S. Cl.
CPC ....... *F21S 48/1258* (2013.01); *F21S 48/1275* (2013.01); *F21S 48/1283* (2013.01); *F21S 48/1317* (2013.01); *G02B 5/021* (2013.01)

(58) Field of Classification Search
CPC .. F21S 48/2212; F21S 48/2218; B60Q 1/2607
USPC ....................................................... 362/521
See application file for complete search history.

(56) References Cited

U.S. PATENT DOCUMENTS

| | | | |
|---|---|---|---|
| 2014/0334177 A1 | 11/2014 | De Lamberterie et al. | |
| 2016/0201867 A1* | 7/2016 | Moser | F21S 48/1258 |
| | | | 362/520 |
| 2016/0215946 A1* | 7/2016 | Kieslinger | F21S 48/145 |
| 2016/0281953 A1* | 9/2016 | Kono | F21S 48/1388 |

FOREIGN PATENT DOCUMENTS

| | | |
|---|---|---|
| DE | 102008023551 A1 | 11/2009 |
| DE | 102009020593 A1 | 11/2010 |
| DE | 102012107426 A1 | 2/2014 |

(Continued)

OTHER PUBLICATIONS

European Search Report for Application No. EP15166297 dated Oct. 14, 2015.
Japanese Office Action for Application No. 2016-093252.

*Primary Examiner* — Ahshik Kim
(74) *Attorney, Agent, or Firm* — Eversheds Sutherland (US) LLP

(57) ABSTRACT

An optical structure for a lighting device of a motor vehicle headlight is disclosed. The optical structure is paired with or is a part of the lighting device such that it modifies a light distribution produced by the lighting device. The optical structure (1) includes two, three or more optical structural elements. Each structural element has a light-scattering effect. A first proportion of the structural elements is formed in such a way that beams generated by the lighting device and impinging on this first proportion of the structural elements pass through the proportion of the structural elements. Each beam is refracted by the relevant structural element to form a first exit beam, to form a second exit beam, and to form at least one further exit beam.

23 Claims, 11 Drawing Sheets

(56) References Cited

FOREIGN PATENT DOCUMENTS

Figure 1:
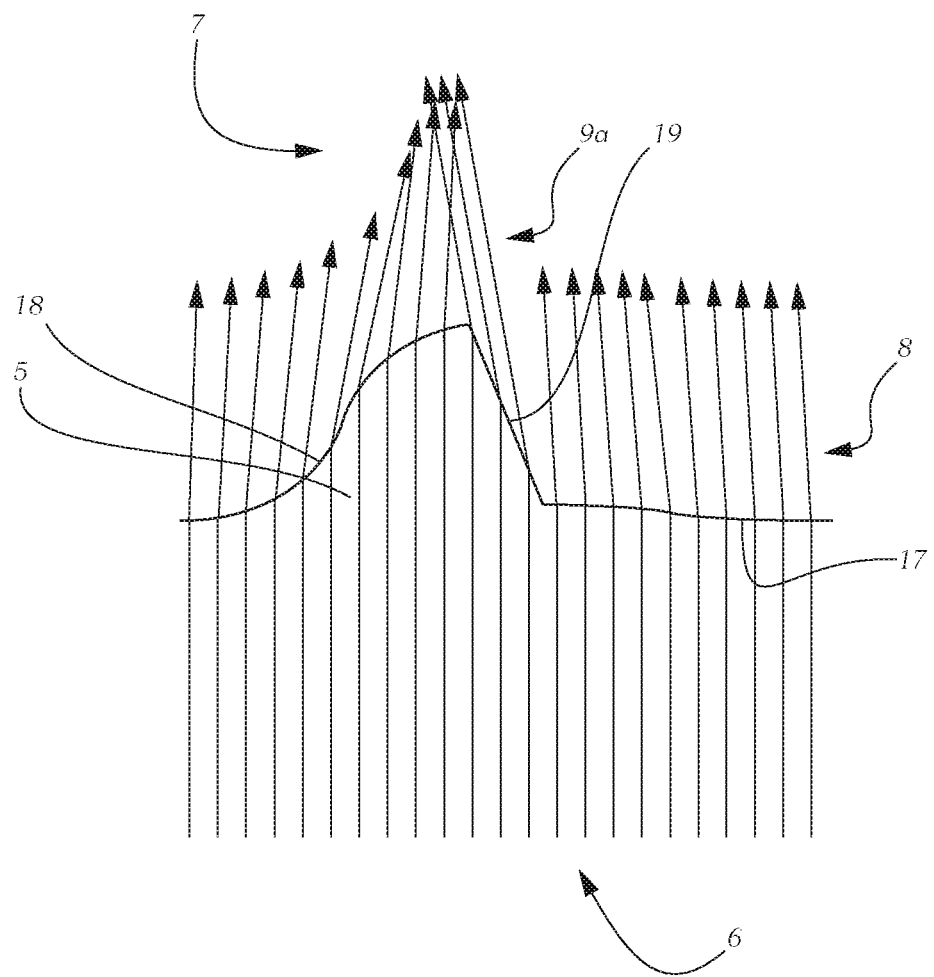

| | | |
|---|---|---|
| EP | 2587125 A2 | 5/2013 |
| JP | 2013225414 A | 10/2013 |
| WO | 2015031924 A1 | 3/2015 |
| WO | 2015031925 A1 | 3/2015 |

* cited by examiner

OPTICAL STRUCTURE FOR SIGNAL LIGHT

The invention relates to an optical structure for a lighting device of a motor vehicle headlight, which lighting device is configured to irradiate light in order to form a first unmodified light distribution in a region in front of the lighting device, wherein the optical structure of the lighting device is paired with or is part of the lighting device in such a way that at least part of the entire luminous flux of the lighting device radiates through the optical structure, wherein the unmodified light distribution generated by the lighting device is modified by the optical structure to provide a predefinable modified second light distribution, wherein the optical structure consists of two, three or more optical structural elements, wherein each structural element has a light-scattering effect.

The invention also relates to a lighting device for a vehicle headlight comprising an optical structure of this type.

The invention additionally relates to a vehicle headlight comprising at least one lighting device of this type.

In accordance with legal provisions, light distributions of vehicle headlights must satisfy a range of conditions.

For example, in accordance with the ECE and SAE, minimum and maximum light intensities are necessary in certain regions above the light-dark line (LD line)—i.e. outside the primarily lit region. These light intensities act as "signlight" and enable overhead direction signs to be lit up with illumination by passing vehicles. The used light intensities usually lie above the usual scattered light values, but far below the light intensities below the LD line. The required light values must be attained with minimal dazzling effect.

"Signlight" is usually provided by special facets in the projection lens (measuring at least a few millimeters) or by discrete, small raised portions. A disadvantage of this is in particular the fact that these structures are perceivable externally as bright light points and therefore are being increasingly rejected, above all for design reasons. In addition, devices of this type are coordinated with the optical system arranged therebehind—if modifications are made thereto, the sought function is no longer guaranteed.

Furthermore, light-dark boundaries that are blurred in a defined manner are necessary for legal reasons, and therefore LD lines are mapped neither too sharply, nor in a manner merged excessively with one another, i.e. the maximum sharpness of the LD line is defined by legal provisions. A blurring of this type of the LD line means that the LD line is perceived by the driver as "softer" and subjectively more comfortably.

This LD transition is quantified by the maximum of a gradient along a vertical section through the light-dark boundary. For this purpose, the logarithm of the illumination intensity is calculated at measurement points distanced by 0.1°, and the difference thereof is formed, whereby the gradient function is obtained. The maximum of this function is referred to as the gradient of the LD boundary. Since this definition only imprecisely replicates the human brightness perception, differently perceived LD lines may have the same measured gradient value, or different gradients may be measured with LD lines that look similar.

Gradient softening is usually implemented by changing the lens surface of a lens of a lighting device. In accordance with the prior art different solutions are common: By random roughening of the lens surface, a softer LD boundary can be achieved by way of example, however this results in a dazzling of oncoming road users. In other variants a modulation (for example superimposition of two sine waves, small indentations in the form of spherical portions, etc.) is applied to the lens surface. Solutions of this type are heavily dependent on the luminous flux distribution through the lens, and changes of this type, for example by variation of the lighting technology, then have a significant and in part negative effect on the luminous flux distribution produced.

The described disadvantages of the prior art are to be overcome. The object of the invention is therefore to provide a refractive optical component with which a light pattern with "signlight" can be provided which satisfies the legally prescribed values and at the same time is not considered to be bothersome.

This object is achieved in accordance with the invention with an optical structure of the type mentioned in the introduction in that a first proportion of the structural elements is formed in such a way that beams generated by the lighting device and impinging on this first proportion of the structural elements pass through the first proportion of the structural elements, wherein each beam is refracted by the relevant structural element to form a first exit beam, to form a second exit beam, and to form at least one further exit beam.

The above-mentioned light pattern generated by a lighting device is formed as a superimposition of scatter patterns of individual structural elements. Here, the scatter pattern of an individual structural element is generated by the light passing through the structural element.

Different regions in the scatter pattern are illuminated when at least two of the exit beams in the scatter pattern are not superimposed.

Here, provision may be made for a second proportion of the structural elements to be formed in such a way that the light impinging on this second proportion of the structural elements is scattered in the form of exactly one beam.

Here, it is quite possible that the second proportion of the structural elements is empty and the optical structure consists only of the structural elements of the first proportion. The size of the second proportion can be dependant for example on how much light has to be scattered in the form of above-mentioned further exit beams.

The production of the optical structure can be easily automated when the structural elements have a hexagonal, preferably a regular hexagonal base area, i.e. the base areas of the structural elements completely cover a hexagonal, preferably a regular hexagonal grid, and the areas between the corner points of the grid are covered by the base area of exactly one structural element.

It can be advantageous in this case when the base areas are formed as regular hexagons and the hexagonal grid is formed as a regular hexagonal grid, which regular hexagonal grid has one, two or more rows extending in parallel, which rows extend parallel to a direction defined by a diagonal over two sides of one of the areas, wherein the base areas formed as regular hexagons of the first proportion of the structural elements cover each second row.

In order to illuminate the signlight region in the light pattern in an optimal manner, it can be advantageous when the first proportion of the structural elements has at least one rising region, one outlet region, and one, two or more rising flanks, wherein the rising region refracts the beam generated by the lighting device and impinging on the relevant structural element in order to form the first exit beam, the outlet region refracts the beam generated by the lighting device and impinging on the relevant structural element in order to form the second exit beam, and the one, two or more rising flanks refracts/refract the beam generated by the lighting device and impinging on the relevant structural element in order to form at least one further exit beam.

Here, provision can be made for the rising region to have a substantially linear course and/or for the outlet region to have a substantially S-shaped course, preferably a course similar to a cos function.

In addition, it is of particular advantage for the manufacture when the rising region transitions continuously into the at least one rising flank and/or the at least one rising flank transitions continuously into the outlet region.

It is additionally advantageous when the structural elements are each formed symmetrically, in particular mirror-symmetrically, with respect to an axis extending through a geometric centre of the structural element parallel to the diagonal over two sides.

In a preferred form of the invention provision is made for the at least one rising flank to be formed substantially in a V-shaped manner in a section through the structural element along a plane parallel to the base area.

Provision can be made advantageously for the at least one rising flank, in a section through the structural element along a plane parallel to the base area, to be symmetrical, in particular mirror-symmetrical, with respect to an axis extending through the geometric centre of the structural element parallel to the diagonal over two sides and for a corner point to have an angle of aperture.

It is advantageous when the angle of aperture is between 2° and 180° or between 10° and 180° or between 20° and 180° or between 30° and 180° or between 40° and 180° or between 50° and 180° or between 60° and 180° or between 70° and 180° or between 80° and 180° or between 90° and 180° or between 100° and 180° or between 110° and 180° or between 120° and 180° or between 130° and 180° or between 140° and 180° or between 150° and 180° or between 160° and 180° or between 170° and 180°.

An optical structure according to the invention is also advantageous for a lighting device, which lighting device is designed to map the light radiated therefrom in the form of a dimmed light distribution, in particular a dipped beam distribution, wherein the dimmed light distribution, in particular the dipped beam distribution, has an LD boundary, wherein, in accordance with the invention, the optical structure, in particular the structural elements, is/are formed in such a way that a portion of the luminous flux of the lighting device is mapped into a region above the LD boundary.

In this way, a signlight as described in the introduction can be produced in an optimal manner with the optical structure according to the invention, in that for example each optical structural element deflects a small part of the luminous flux passing through the structural element into a corresponding region. Here, it is expedient to consider the angles of deflection of individual exit beams on a scatter pattern, on which scatter pattern an orthogonal coordinate system having a horizontal axis (h-axis) and a vertical axis (v-axis) is defined.

In a specific embodiment of the invention provision is made for the structural elements to have a rising region, an outlet region and exactly one rising flank, wherein the part of the beam impinging on the rising region of the structural element is refracted to form a first exit beam, which first exit beam is scattered below the h-axis, the part of the beam impinging on the outlet region of the structural element is refracted to form a second exit beam, which second exit beam is scattered above the h-axis, and the part of the beam impinging on the flank of the structural element is refracted to form a third exit beam, which third exit beam is scattered above the h-axis.

Here, it has proven to be expedient when the second exit beam is scattered in a region between 0° and 3° above the h-axis.

In order to ensure the desired deflection of the exit beams, it is expedient when the flank has a slope in a range between 5° and 20° or has a slope of approximately 13.8° or 18.9° and the third exit beam is scattered in a region between 2° and 4° or between 4° and 5° or between 5° and 7° above the h-axis.

In a further specific embodiment provision can be made for the structural elements to have a rising region, an outlet region and exactly three rising flanks, wherein the part of the beam impinging on the rising region of the structural element is refracted to form a first exit beam, which first exit beam is scattered below the h-axis, the part of the beam impinging on the outlet region of the structural element is refracted to form a second exit beam, which second exit beam is scattered above the h-axis, and the part of the beam impinging on the flanks of the structural element is refracted to form a third, a fourth and a fifth exit beam, respectively, wherein the exit beams are scattered in a region above the h-axis and the fourth exit beam overlaps neither the third exit beam nor the fifth exit beam in the scatter pattern.

Here, it is expedient when the second exit beam is scattered in a region between 0° and 3° above the h-axis.

It is additionally expedient when the first and third flank have a slope in a range between 8° and 12° or a slope of approximately 10°, and the second flank has a slope in a range between 12° and 16° or a slope of approximately 14°, and the third and the fifth exit beam are scattered in a region between 4° and 6° above the h-axis, and the fourth exit beam is scattered in a region between 6° and 8° above the h-axis.

In addition, provision can be made for the structural elements to have a rising region, an outlet region and a flank, wherein the flank is V-shaped and has a corner point and an angle of aperture, wherein the corner point lies in the geometric centre of its base area, wherein the part of the beam impinging on the rising region of the structural element is refracted to form a first exit beam, which first exit beam is scattered below the h-axis, the part of the beam impinging on the outlet region of the structural element is refracted to form a second exit beam, which second exit bean is scattered above the h-axis, and the part of the beam bundle impinging on the V-shaped flank of the structural element is refracted to form a third and a fourth exit beam, wherein the exit beams are scattered in a region above the h-axis, and the third exit beam and the fourth exit team do not overlap in the scatter pattern.

Here, provision is made advantageously for the V-shaped flank to have a slope in a range between 8° and 20° or a slope of approximately 18.9°, and for the third exit beam to be scattered vertically in a region between 3° and 7° and horizontally between minus 12° and minus 7°, and for the fourth exit beam to be scattered vertically in a region between 3° and 7° and horizontally between plus 7° and plus 12°.

It is advantageous when the structural elements have their maximum distance from the base area at the geometric centre of their base area.

In order to mitigate the interference effects, it is advantageous when the dimensions of a structural element, for example a circum diameter and/or the maximum distance from the base area, are greater, in particular very much greater, than the wavelength of visible light.

Specifically, provision can be made here for the maximum distance form the base area to lie in the micrometer range.

Here, it is advantageous when the maximum distance from the base area lies in the range of 5-10 micrometers or in the range of 10-13 micrometers or in the range of 13-17 micrometers or is approximately 9.3 micrometers or approximately 10.6 micrometers or approximately 12.15 micrometers or approximately 16.6 micrometers.

Provision is made in a specific embodiment for the circum diameter or a length of the structural elements to lie in the millimeter range.

Here, it can be advantageous when the diameter or a length of the structural elements lies between 0.5-2 millimeters or is approximately 1 millimeter.

Provision is preferably made for the optical structure to be arranged on at least one, preferably exactly one boundary surface of an optics element, which is formed as a diffusing or covering plate of the lighting device.

Provision can be made in a specific embodiment for the optical structure to be arranged on at least one surface of an optics element in the form of a lens, in particular a projection lens of the lighting device.

In addition, it is particularly advantageous when the optical structure is arranged on the light exit side of the lens.

Under consideration of a particular (unmodified) light bundle from the entire luminous flux, this thus makes a certain contribution to the light distribution in the light pattern (the entire luminous flux generates the (overall) light distribution). By way of example, the unmodified light bundle generates a light distribution contribution having a particular form, i.e. particular regions on the road or on a test screen are illuminated, and other regions are not illuminated.

Provision is made in a specific embodiment of the invention for the first exit beam of the first unmodified light distribution to be modified to form the second modified light distribution, whereby the second modified light distribution has a lower gradient of the LD boundary.

Here, it can be expedient when the further exit beams modify first unmodified light distribution to form the second modified light distribution and form a "signlight" partial light distribution.

Lastly, the invention also relates to a lighting device comprising at least one, preferably exactly one optical structure as described above.

The lighting device is a projection system, for example.

Provision is preferably made in this case for the lighting device to comprise at least one light source, at least one reflector and at least one lens, in particular a projection lens.

Here, it may be advantageous when the at least one optical structure is arranged on the lens and/or is formed as an additional optics element.

However, provision can also be made for the lighting device to be a reflection system.

Here, it has proven to be expedient when the lighting device comprises at least one free-form reflector and at least one light source and also at least one diffusing and/or at least one covering plate.

Here, it is advantageous when the at least one optical structure is arranged on the at least one diffusing and/or the at least one covering plate and/or is formed as an additional optics element.

Figure 2:
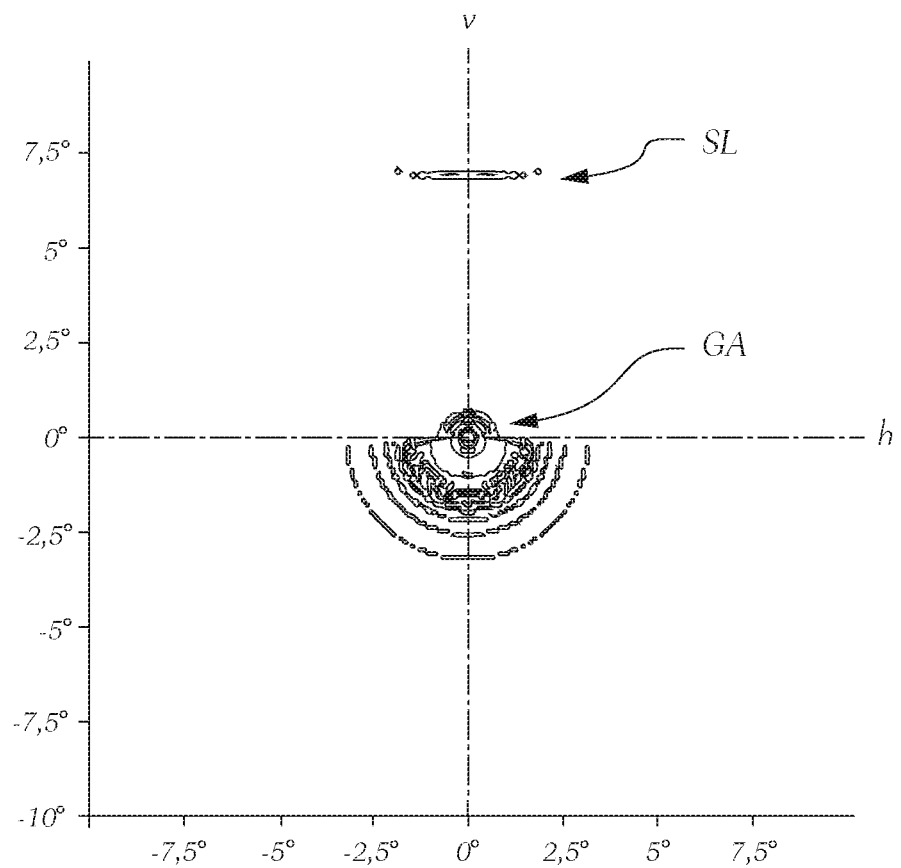
Figure 3:
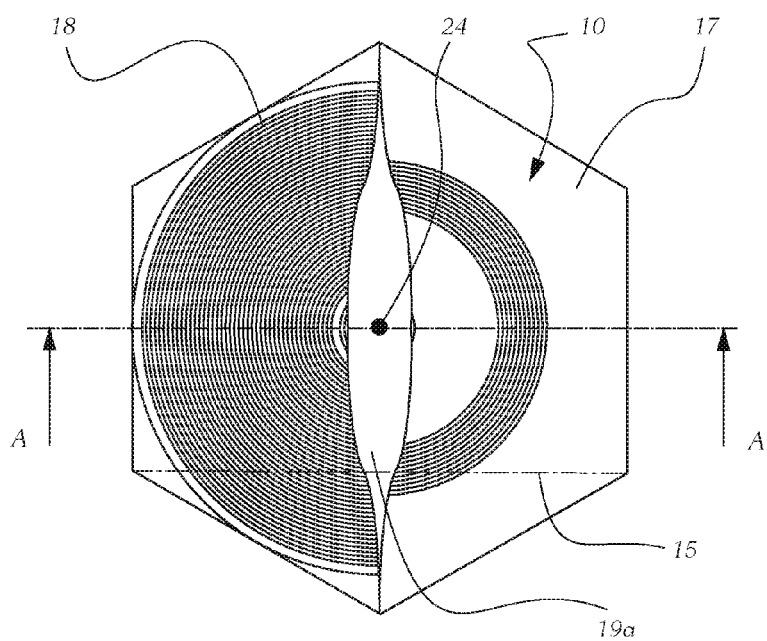
Figure 4:
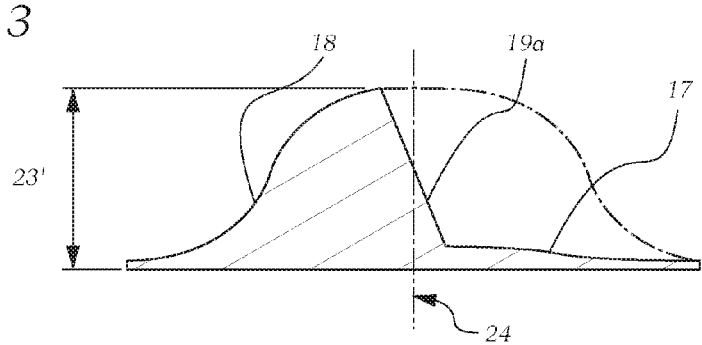
Figure 5:
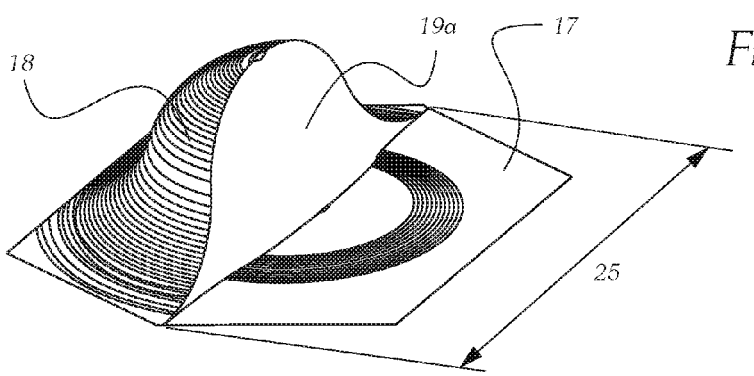
Figure 6:
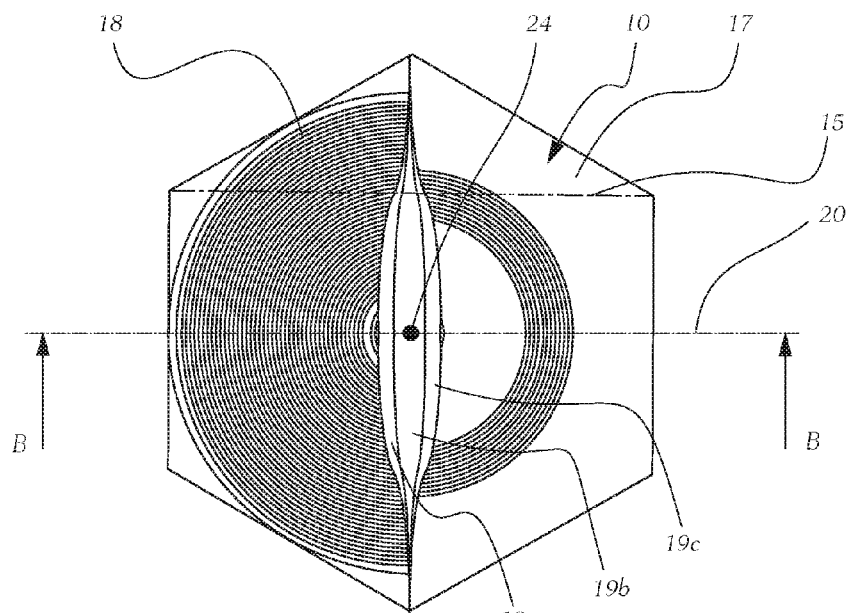
Figure 7:
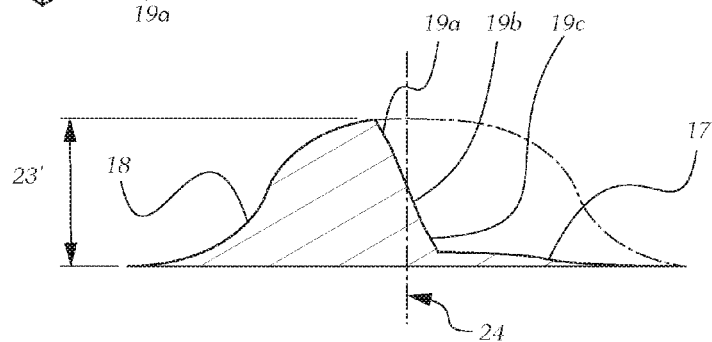
Figure 8:
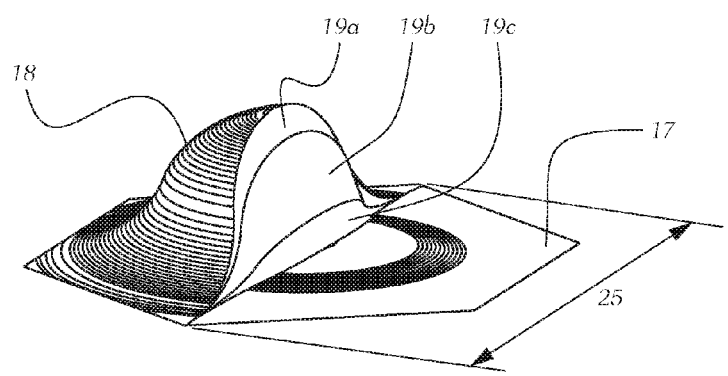
Figure 9:
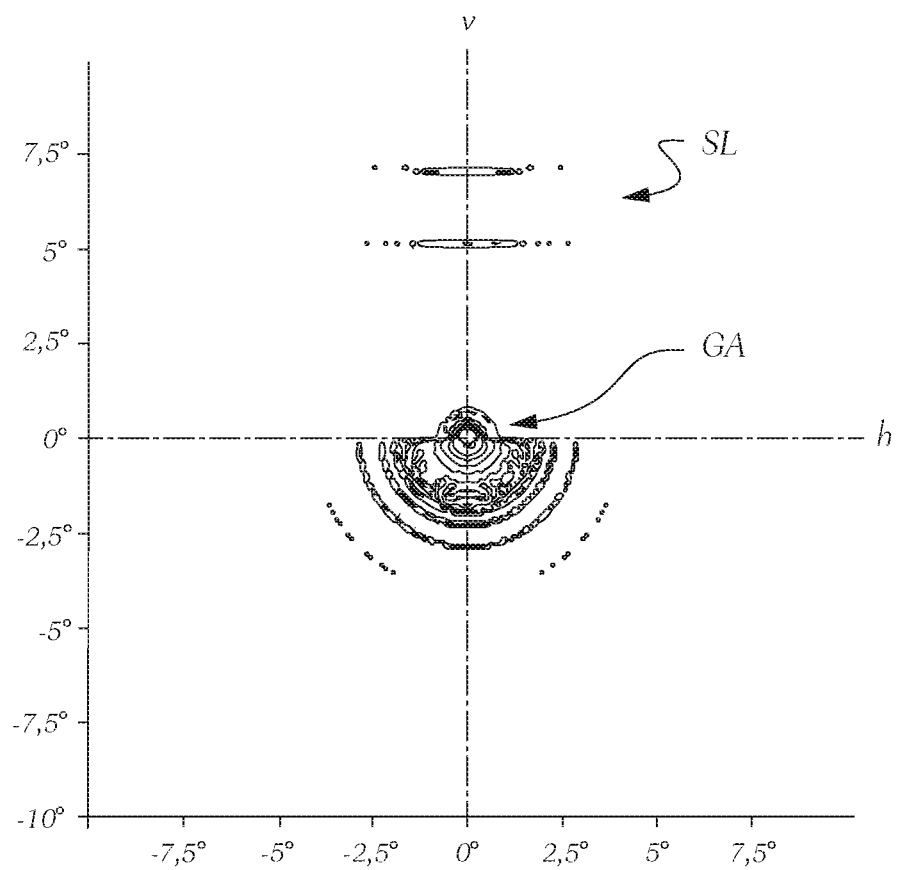

The present invention will be presented in greater detail hereinafter on the basis of preferred and non-limiting exemplary embodiments relating to three embodiments of structural elements and illustrated in the accompanying drawings, in which:

FIG. 1 shows a side sectional view of an exemplary embodiment of a structural element having a straight flank and a beam impinging on this element, and also three exit beams, FIG. 2 shows a scatter pattern of the structural element from FIG. 1, FIG. 3 shows a plan view of a structural element having a rising flank with a hexagonal base area, FIG. 4 shows a side section AA of the structural element from FIG. 1, FIG. 5 shows a perspective view of the structural element from FIG. 1, FIG. 6 shows a plan view of a structural element having three rising flanks with a hexagonal base area, FIG. 7 shows a side section BB of the structural element from FIG. 4, FIG. 8 shows a perspective view of the structural element from FIG. 4, FIG. 9 shows a scatter pattern of the structural element from FIG. 4

Figure 10:
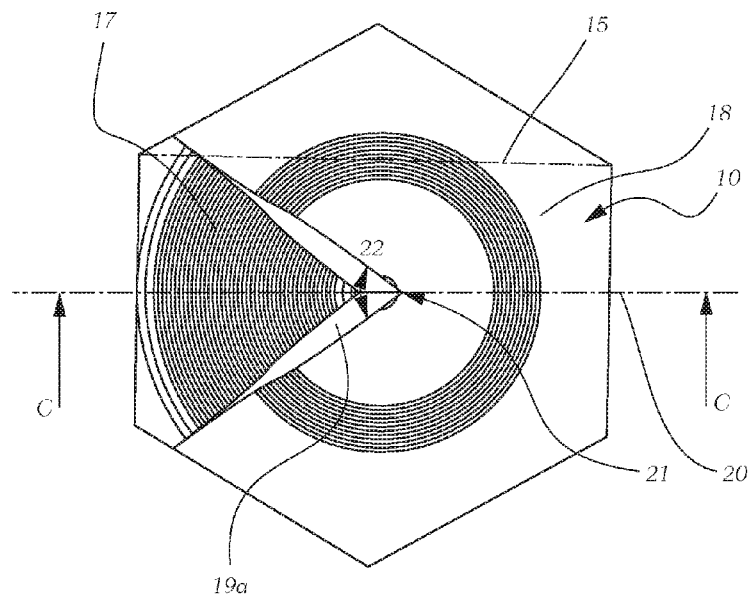
Figure 11:
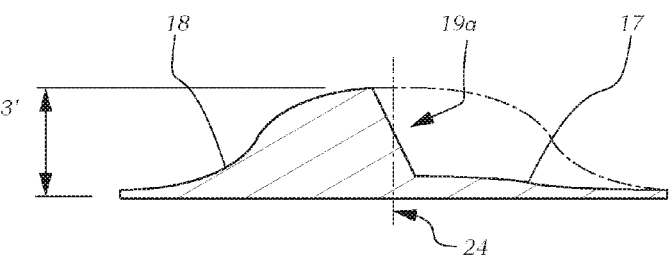
Figure 12:
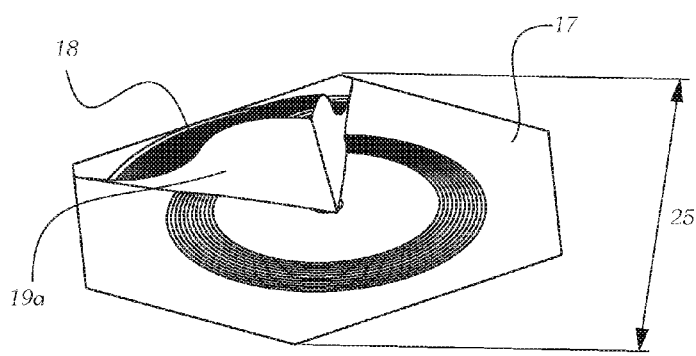
Figure 13:
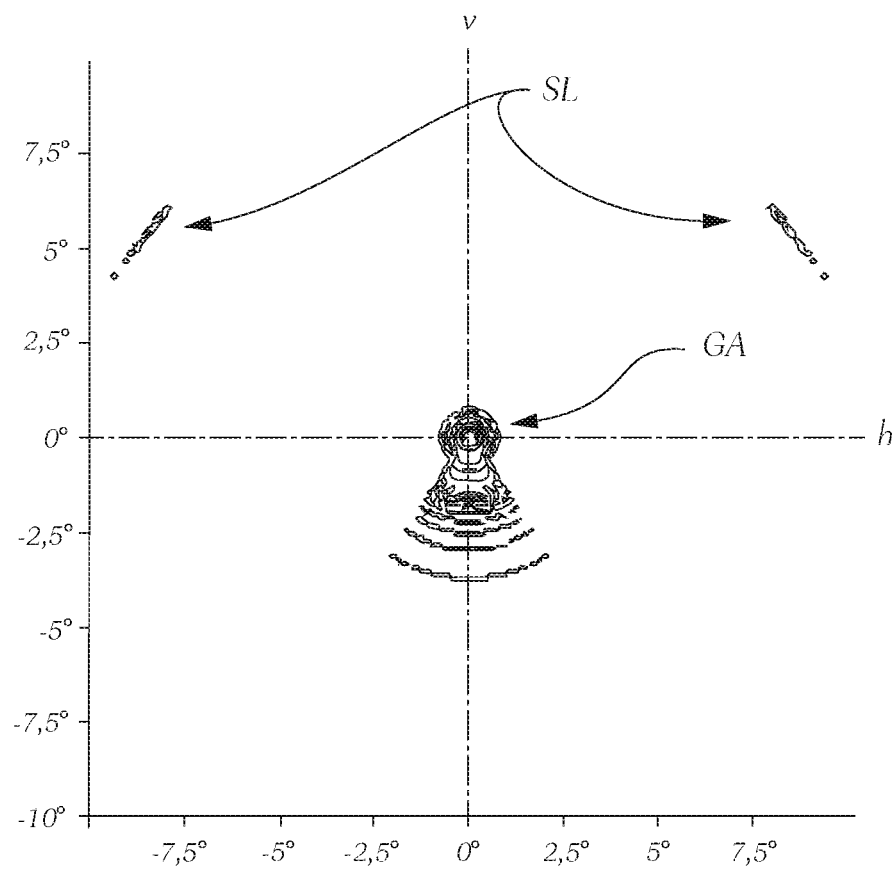
Figure 14:
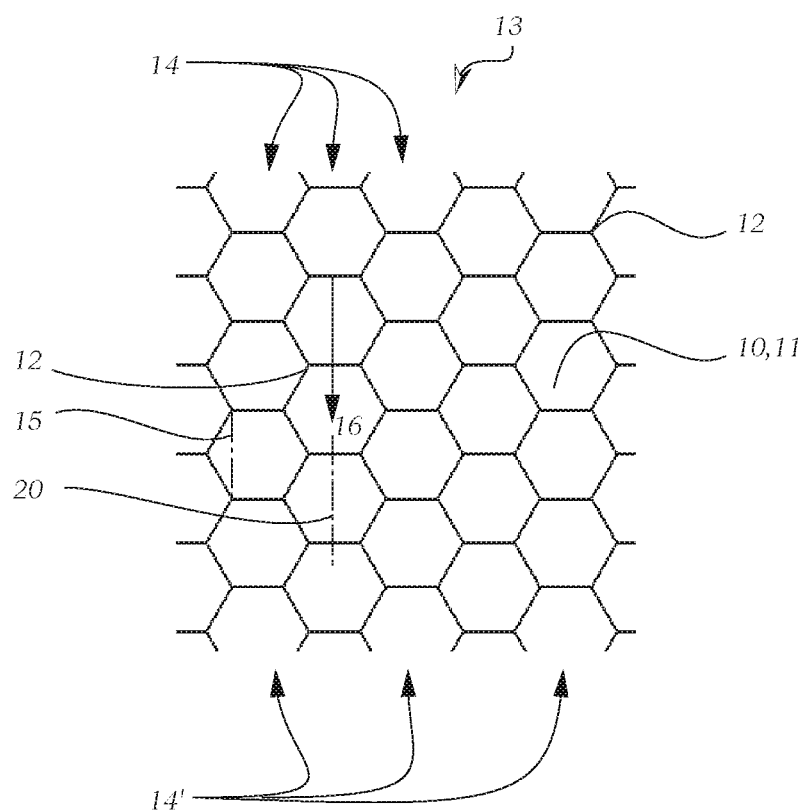
Figure 15:
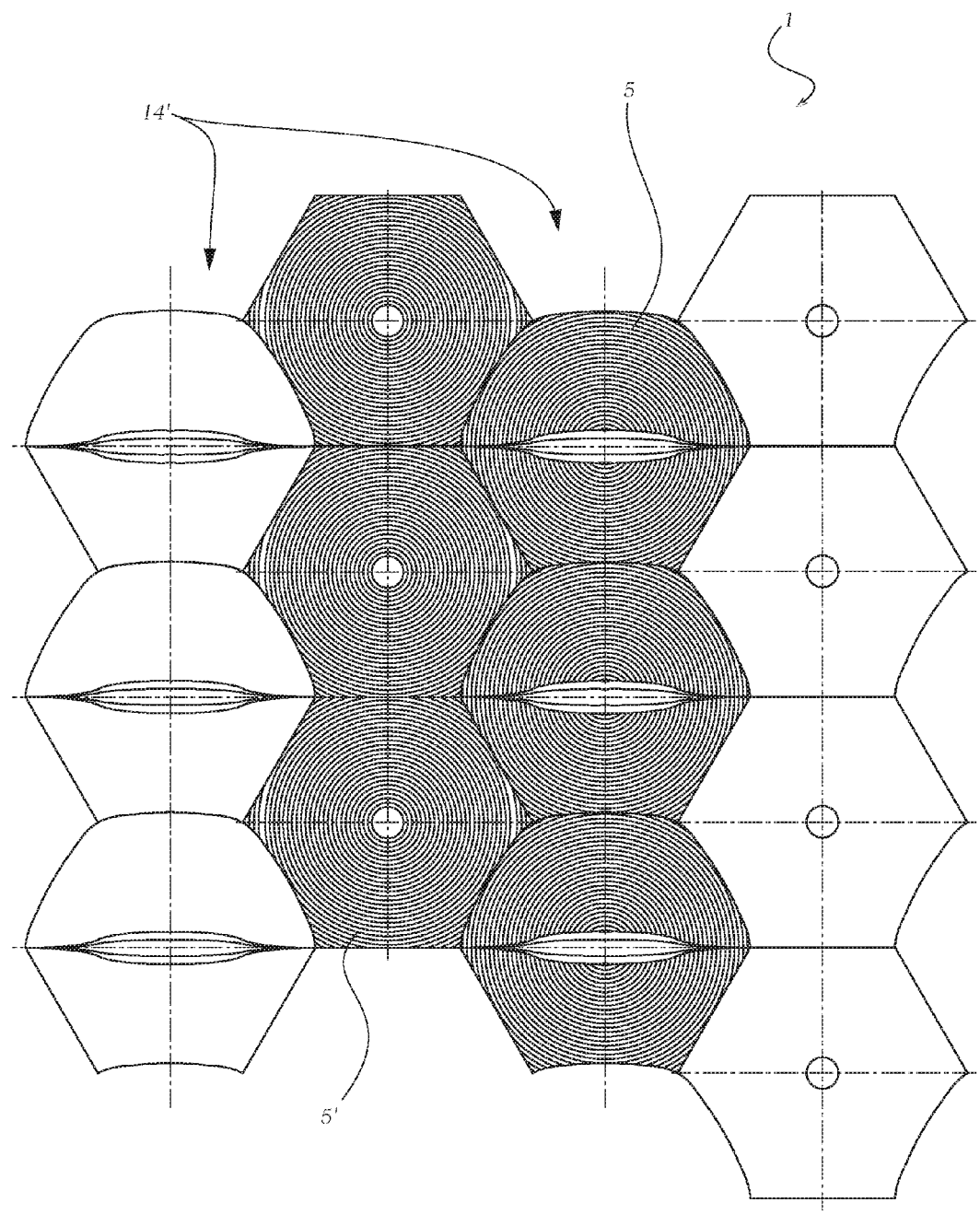
Figure 16:
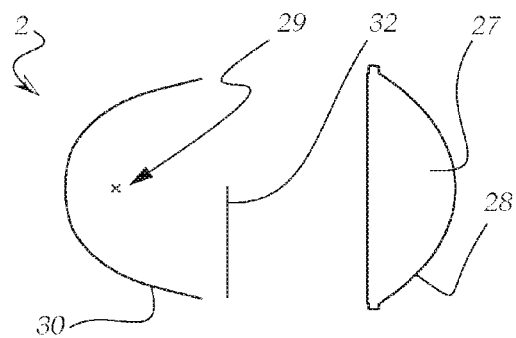
Figure 17:
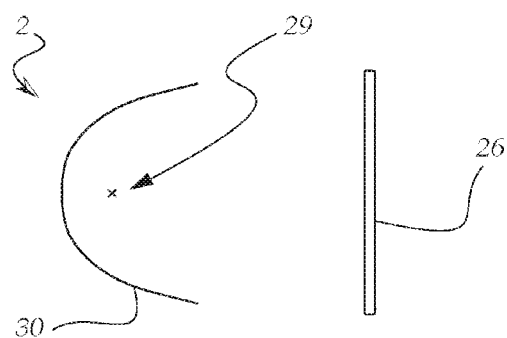
Figure 18:
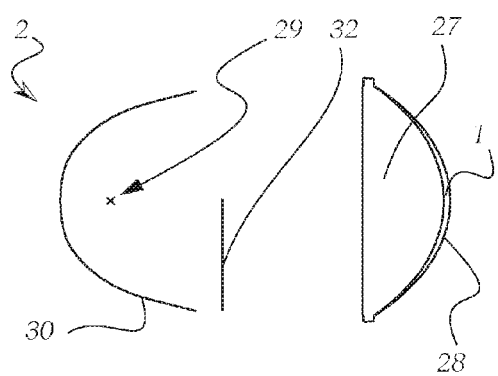
Figure 19:
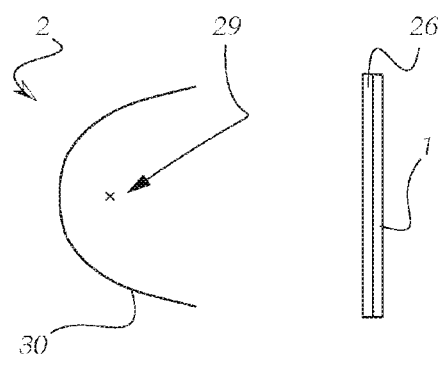
Figure 20:
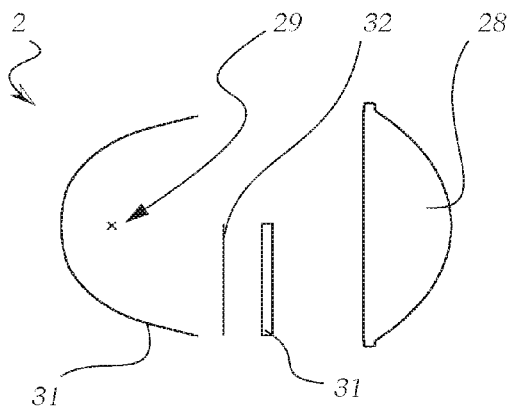
Figure 21:
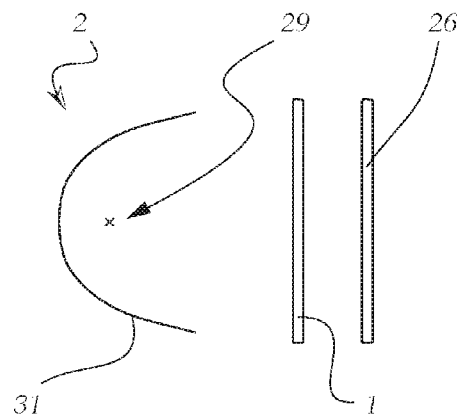
Figure 22:
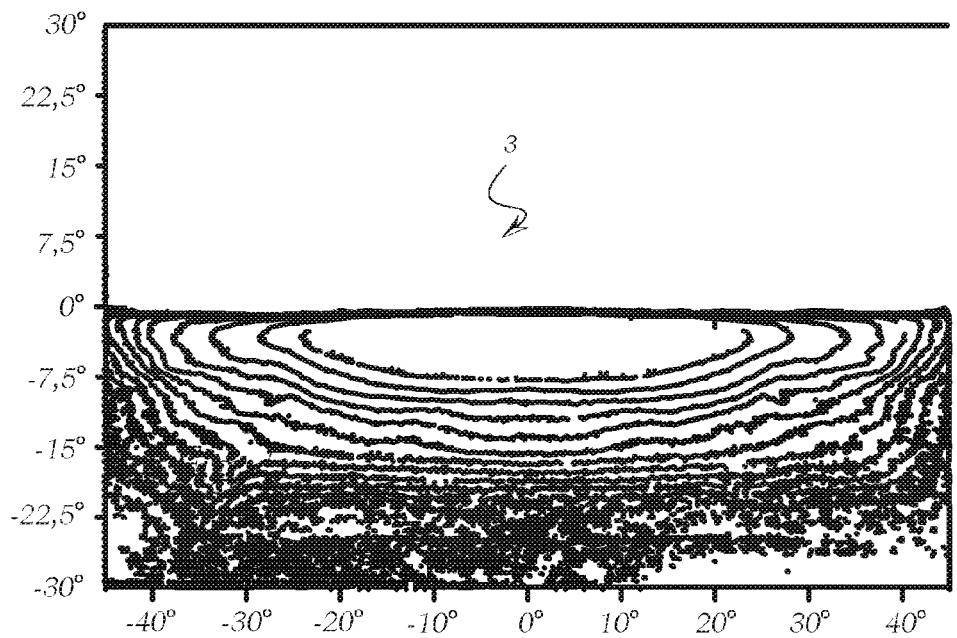
Figure 23:
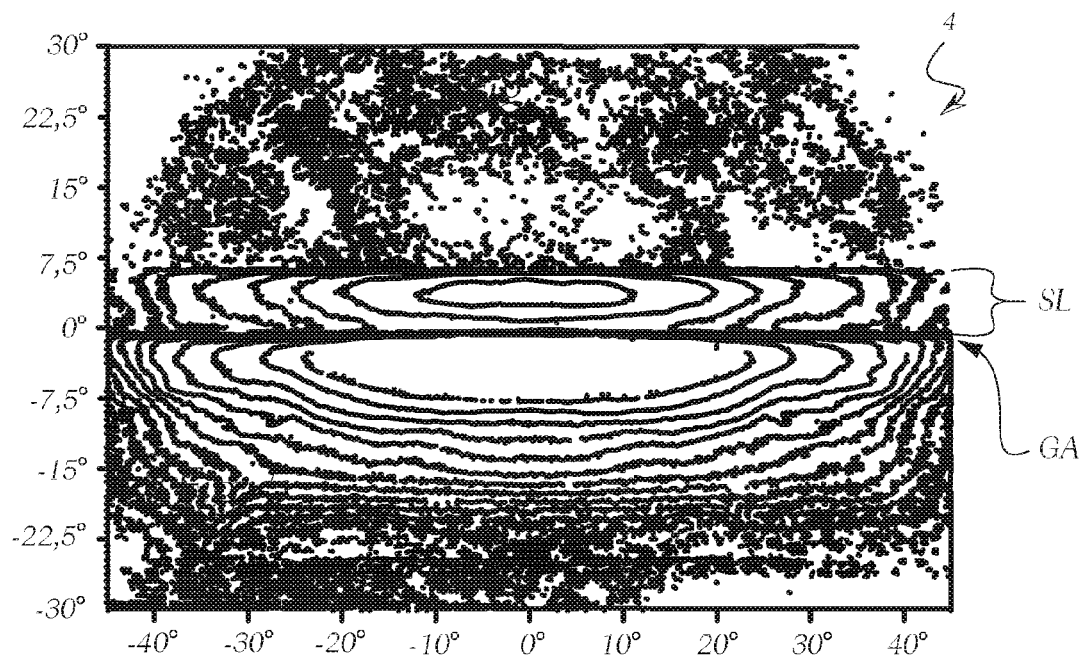

FIG. 10 shows a plan view of a structural element having a rising V-shaped flank with a hexagonal base area, FIG. 11 shows a side section CC of the structural element from FIG. 7, FIG. 12 shows a perspective view of the structural element from FIG. 7, FIG. 13 shows a scatter pattern of the structural element from FIG. 7, FIG. 14 shows a hexagonal regular grid, FIG. 15 shows an arrangement of the structural elements in each second row of a hexagonal grid, FIG. 16 shows a schematic illustration of a projection module according to the prior art, FIG. 17 shows a schematic illustration of a reflection module according to the prior art, FIG. 18 shows a schematic illustration of a projection module having an optical structure according to the invention on the outer side of a lens, FIG. 19 shows a schematic illustration of a reflection module having an optical structure according to the invention on the outer side of a covering or diffusing plate, FIG. 20 shows a schematic illustration of a projection module having an optical structure according to the invention on an additional optics element, such as a plate, FIG. 21 shows a schematic illustration of a reflection module having an optical structure according to the invention on an additional optics element, such as a plate, FIG. 22 shows an unmodified dipped beam distribution, and FIG. 23 shows a modified dipped beam distribution.

Reference is made first to FIG. 1, which shows a side view of a structural element 5 having a rising region 17, an outlet region 18, and a flank 19a. An impinging light bundle 6 emitted by illumination (not shown here) passes through the structural element and is refracted differently as it exits, depending on whether the proportion of the beam 6 passing through exits that the rising region 17, at the outlet region 18, or at the flank 19a. Here, a total of three different beams 7, 8, 9a, which are not superimposed, are formed in the scatter pattern. The resultant scatter pattern is shown in FIG. 2, which illustrates a scatter pattern of the structural element 5 having the flank 19a. Here, the beam 7 contributes to the softening of the gradient (region GA in FIG. 2) of the modified second light distribution, wherein the above-described signlight is produced by the beam 9a (region SL in FIG. 2).

The structural element 5 of FIG. 1 is illustrated from different perspectives in FIG. 3 to FIG. 5. FIG. 3 thus shows a plan view of the structural element 5 having a rising flank 19a with a hexagonal base area 10. The structural element 5 is mirror-symmetrical with respect to the line AA extending through a geometric centre 24 of the structural element 5 and parallel to a diagonal over two sides 15 of the hexagonal base area 10. A side section along the line AA in FIG. 3 of the structural element 5 can be seen in FIG. 4, wherein it is evident that the rising region 17 extends in a linear manner and the outlet region 18 extends substantially in an S-shaped manner, preferably similarly to a cos function. FIG. 5 shows a perspective view of the structural element from FIG. 3.

FIGS. 6 to 13 relate to two further embodiments of the structural element 5 and the associated scatter patterns (FIG. 9 and FIG. 13).

FIG. 6 shows a plan view of a structural element 5 having three rising flanks 19a, 19b, 19c with a hexagonal base area 10. Here, five different beams are formed as an impinging beam passes through said structural element. The angles of inclination of the flanks 19a and 19c are the same and are different from the angle of inclination of the flank 19b. As a result, the beam that exits at the flank 19a superimposes the beam 19c exiting at the flank 19c in the scatter pattern, which is evident from the scatter pattern illustrated in FIG. 9, in which the light contribution to the signlight region SL comprises two segments instead of three. FIG. 7 shows a side section BB of the structural element from FIG. 6, wherein the different angles of inclination of the flanks are illustrated. FIG. 8 shows a perspective view of the structural element from FIG. 6.

FIG. 10 shows a plan view of a structural element having a rising V-shaped flank 19a with a hexagonal base area 10. Here, the V-shaped flank 19a encloses an angle of aperture 22 and is formed in such a way that its corner point 21 lies in the geometric centre 21 of the structural element 5, which is the same as the geometric centre of the hexagonal base area 10. As a result of the V shape of the flank 19a, a total of four exit beams propagating in different spatial directions are formed as the impinging beam 6 exits the structural element, said exit beams not being superimposed in the scatter pattern. The light contribution to the signlight region SL in FIG. 13 consists substantially of two elongate segments inclined relative to the h-axis. The light contribution to the gradient softening GA is greater in this embodiment of the structural element. FIG. 11 shows a side section CC of the structural element from FIG. 10. FIG. 12 shows a perspective view of the structural element from FIG. 10.

All embodiments of the structural elements have characteristic dimensions, such as the maximum distance 23 of the structural element 5 from the base area 10 and the circum diameter 25. These dimensions each lie in the micrometer or millimeter range and, compared to the typical wavelengths of the light irradiated by the lighting device, are large enough so that no interference effects occur.

All structures cover a hexagonal grid 13, which is illustrated in FIG. 14. The grid 13 in FIG. 14 is a regular hexagonal grid, although deviations from the regularity of the grid are quite conceivable. The base areas 10 of the structural elements 5, 5' completely cover the areas 11 between the corner points 12 of the grid 13, wherein each area 11 is covered by the base area 10 of exactly one structural element 5, 5'. Furthermore, the grid can be divided into a number of rows 14 extending in parallel. A row 14 of this type consists of a plurality of adjacent areas 11 and extends in a direction 16 defined by a diagonal over two sides 15 of an area 11

FIG. 15 shows an exemplary embodiment of an optical structure, in which the base areas 10 of the structural elements 5 cover each second row 14' of the hexagonal grid 13 and the base areas of the rest of the structural elements 5' cover the remaining areas of the hexagonal grid 13.

The possible arrangements of the optical structure 1 formed from structural elements 5, 5' in a lighting device 2 will be discussed in greater detail.

FIG. 16 schematically shows a lighting device 2 in the form of a projection system, comprising a reflector 30, a light source 29, a (optional) screen arrangement 32, and a projection lens 27, having a curved outer side 28 and a planar inner side.

FIG. 17 schematically shows a lighting device 2 in the form of a reflection system, comprising a reflector 30, a light source 29, and a diffusing or covering plate 26.

FIG. 18 shows a schematic illustration of the projection system from FIG. 16, wherein an optical structure 1 according to the invention is arranged on the outer side 28 of a lens 27. This optical structure 1 preferably occupies the entire outer side 28 of the lens 29.

FIG. 19 shows a schematic illustration of the reflection module from FIG. 17 comprising an optical structure 1 according to the invention on the outer side of the covering or diffusing plate 26, wherein the optical structure preferably occupies the entire outer side of the plate 26.

FIG. 20 again shows a schematic illustration of a projection module as illustrated in FIG. 16, comprising an optical structure 1 according to the invention on an additional optics element 31, such as a plate, wherein the optics element 31 is arranged between the screen 32 and the lens 28.

FIG. 21 lastly again shows a schematic illustration of a reflection module from FIG. 17 comprising an optical structure 1 according to the invention on an additional optics element 31, such as a plate, which is arranged between the light source 29 and the diffusing or covering plate 26.

These illustrations serve merely to explain some of the possibilities of the arrangement of an optical structure 1 according to the invention. In principle, a lighting device can also have a plurality of light sources, for example can have LEDs as light sources, and the light-shaping body can be provided in the form of one or more light guides, reflectors, etc.

It is generally true that the optical structure 1 of the lighting device 2 is paired with or is part of the lighting device 2 in such a way that at least part of the entire luminous flux of the lighting device 2, preferably the entire optically relevant luminous flux, passes through the optical structure 1.

It is in particular advantageous when the optical structure is arranged and/or formed in such a way that it illuminates homogeneously.

Lastly, FIGS. 22 and 23 show the first unmodified light distribution 3 and the second modified light distribution 4. Here, the first unmodified light distribution is illustrated in FIG. 22 as a dipped beam distribution 3 having a linear LD boundary. The second modified light distribution 4 in FIG. 23 is a modification of the first light distribution 3 and comprises two additional regions created as a result of the use of the optical structure according to the invention: the region of gradient softening GA and the signlight region SL.

It can be seen in FIG. 23 that the region SL is lit up above an LD boundary with a certain illumination intensity in order to generate a signlight. Here, a proportion of the luminous flux of the lighting device 2 is imaged into this region SL, i.e. above the LD line. In this way, a signlight of the type described in the introduction can be generated in an optimal manner using the optical structure 1 according to the invention.

The LD boundary has a lower gradient than the LD boundary of the unmodified light distribution, as is indicated schematically by the greater distance between the isolux lines in the region of the light-dark boundary. The LD boundary of the second modified light distribution 4 is thus "softer".

The invention claimed is:

1. An optical structure for a lighting device (2) of a motor vehicle headlight, which lighting device (2) is configured to irradiate light in order to form a first unmodified light distribution (3) in a region in front of the lighting device (2), wherein the optical structure (1) of the lighting device (2) is paired with or is part of the lighting device (2) in such a way that at least part of an entire luminous flux of the lighting device (2) radiates through the optical structure (1), wherein the first unmodified light distribution (3) generated by the lighting device (2) is modified by the optical structure (1) to provide a predefinable modified second light distribution (4), the optical structure (1) comprising:

two, three, or more optical structural elements (5, 5'), wherein each structural element (5, 5') has a light-scattering effect, wherein a first proportion of the structural elements (5) is formed such that beams (6) generated by the lighting device (2) and impinging on the first proportion of the structural elements (5) pass through the first proportion of the structural elements (5), wherein each beam (6) is refracted by the relevant structural element (5) to form a first exit beam (7), a second exit beam (8), and at least one further exit beam (9a).

2. The optical structure according to claim 1, wherein at least two of the exit beams (7, 8, 9a) in a scatter pattern are not superimposed.

3. The optical structure according to claim 1, wherein a second proportion of the structural elements (5') is formed in such a way that the light impinging on the second proportion of the structural elements (5') is scattered in the form of exactly one beam.

4. The optical structure according to claim 1, wherein the structural elements (5, 5') each have a regular hexagonal base area (10) such that the regular hexagonal base areas (10) of the structural elements (5, 5') completely cover a regular hexagonal grid (13) and areas (11) between corner points (12) of the regular hexagonal grid (13) are covered by the regular hexagonal base area (10) of exactly one structural element (5, 5').

5. The optical structure according to claim 4, wherein the regular hexagonal grid has one, two, or more rows (14) extending in parallel, which rows (14) extend parallel to a direction (16) defined by a diagonal over two sides (15) of one of the areas (11), wherein the regular hexagonal base areas (10) formed as regular hexagons of the first proportion of the structural elements (5) cover each second row (14').

6. The optical structure according to claim 1, wherein the first proportion of the structural elements (5) has at least one rising region (17), one outlet region (18), and one, two, or more rising flanks (19a, 19b, 19c), wherein the rising region (17) refracts the beam (6) generated by the lighting device (2) and impinging on the relevant structural element (5) in order to form the first exit beam (7), the outlet region (18) refracts the beam (6) generated by the lighting device (2) and impinging on the relevant structural element (5) to form the second exit beam (8), and the one, two or more rising flanks (19a, 19b, 19c) refracts/refract the beam (6) generated by the lighting device (2) and impinging on the relevant structural element (5) to form the at least one further exit beam (9a).

7. The optical structure according to claim 6, wherein the rising region (17) transitions continuously into the at least one rising flank (19a, 19b, 19c).

8. The optical structure according to claim 6, wherein the structural elements (5) are each formed symmetrically with respect to an axis (20) extending through a geometric centre (24) of the structural element (5) parallel to a diagonal over two sides (15).

9. The optical structure according to claim 6, wherein the at least one rising flank (19a) is substantially V-shaped in a section through the structural element (5) along a plane parallel to a base area (10).

10. The optical structure according to claim 6, wherein the at least one rising flank (19a), in a section through the structural element (5) along a plane parallel to a base area (10), is formed symmetrically with respect to an axis (20) extending through a geometric centre (24) of the structural element (5) parallel to a diagonal over two sides (15) and has a corner point (21) and an angle of aperture (22), which angle of aperture (22) lies in a range between 2° and 180°.

11. The optical structure according to claim 6, wherein the at least one rising flank (19a, 19b, 19c) transitions continuously into the outlet region (18).

12. The optical structure according to claim 1, wherein the structural elements (5) have a rising region (17), an outlet region (18) and exactly one rising flank (19a), wherein a part of the beam (6) impinging on the rising region (17) of the structural element is refracted to form the first exit beam (7), which first exit beam (7) is scattered below an h-axis, a part of the beam (6) impinging on the outlet region (18) of the structural element is refracted to form the second exit beam (8), which second exit beam (8) is scattered above the h-axis, a part of the beam (6) impinging on the flank (19a) of the structural element is refracted to form the third exit beam (9a), which third exit beam (9a) is scattered above the h-axis, and the second exit beam (8) is scattered in a region between 0° and 3° above the h-axis, and the flank (19a) has a slope in a range between 5° and 20°, and the third exit beam (9a) is scattered in a region between 2° and 4° or between 4° and 5° or between 5° and 7° above the h-axis.

13. The optical structure according to claim 1, wherein the structural elements (5) have a rising region (17), an outlet region (18), and exactly three rising flanks (19a, 19b, 19c), wherein a part of the beam (6) impinging on the rising region (17) of the structural element is refracted to form the first exit beam (7), which first exit beam (7) is scattered below an h-axis, a part of the beam (6) impinging on the outlet region (18) of the structural element is refracted to form the second exit beam (8), which second exit beam (8) is scattered above the h-axis, a part of the beam (6) impinging on the flanks (19a, 19b, 19c) of the structural element is refracted to form a third, a fourth and a fifth exit beam (9a), wherein the exit beams (9a) are scattered in a region above the h-axis, and the fourth exit beam overlaps neither the third exit beam (9a) nor the fifth exit beam in the scatter pattern, and the second exit beam (8) is scattered in a region between 0° and 3° above the h-axis, and the first and the third flank (19a, 19c) have a slope in a range between 8° and 12°, and the second flank (19b) has a slope in a range between 12° and 16°, and the third and the fifth exit beams (9a) are scattered in a region between 4° and 6° above the h-axis, and the fourth exit beam is scattered in a region between 6° and 8° above the h-axis.

14. The optical structure according to claim 1, wherein the structural elements (5) have a rising region (17), an outlet region (18), and a flank (19a), wherein the flank (19a) is V-shaped and has a corner point (21) and an angle of aperture (22), wherein the corner point (21) lies in a geometric centre (24) of its base area (10), wherein a part of the beam (6) impinging on the rising region (17) of the structural element is refracted to form the first exit beam (7), which first exit beam (7) is scattered below an h-axis, a part of the beam (6) impinging on the outlet region (18) of the structural element is refracted to form the second exit beam (8), which second exit beam (8) is scattered above the h-axis, the part of the beam (6) impinging on the V-shaped flank (19a) of the structural element is refracted to form a third and a fourth exit beam (9a), wherein the exit beams (9a) are scattered in a region above the h-axis, and the third exit beam (9a) and the fourth exit beam do not overlap in the scatter pattern, which V-shaped flank (19a) has a slope in a range between 8° and 20°.

15. The optical structure according to claim 14, wherein the third exit beam (9a) is scattered vertically in a region between 3° and 7° and horizontally between minus 12° and minus 7°.

16. The optical structure according to claim 14, wherein the fourth exit beam is scattered vertically in a region between 3° and 7° and horizontally between plus 7° and plus 12°.

17. The optical structure according to claim 1, wherein the dimensions of a circum diameter (25) and/or a maximum distance (23) from a base area (10) are greater than a wavelength of visible light.

18. The optical structure according to claim 1, wherein the optical structure is arranged on at least one boundary surface of an optics element, which is formed as a diffusing or a covering plate (26) of the lighting device (2) and/or is arranged on at least one surface of an optics element in the form of a lens (27) and/or is arranged on a light exit side (28) of the lens (27).

19. The optical structure according to claim 1, wherein the first exit beams (7) modify the first unmodified light distribution (3) to form the second modified light distribution (4) such that the second modified light distribution (4) has a lower gradient of an LD boundary, and the further exit beams (9a) modify the first unmodified light distribution (3) to form the second modified light distribution (4) and form a partial light distribution.

20. A lighting device, which is configured to irradiate light in order to form a first unmodified light distribution (3) in a region in front of the lighting device (2), the lighting device (2) comprising:
at least one optical structure (1),
wherein the optical structure (1) of the lighting device (2) is paired with or is part of the lighting device (2) such that at least part of an entire luminous flux of the lighting device (2) radiates through the optical structure (1),
wherein the first unmodified light distribution (3) generated by the lighting device (2) is modified by the optical structure (1) to provide a predefinable modified second light distribution (4),
wherein the optical structure (1) comprises two, three, or more optical structural elements (5, 5'),
wherein each structural element (5, 5') has a light-scattering effect,
wherein a first proportion of the structural elements (5) is formed in such a way that beams (6) generated by the lighting device (2) and impinging on the first proportion of the structural elements (5) pass through the first proportion of the structural elements (5), and
wherein each beam (6) is refracted by the relevant structural element (5) to form a first exit beam (7), a second exit beam (8), and at least one further exit beam (9a).

21. The lighting device according to claim 20, wherein the lighting device (2) is a projection system, which lighting device (2) comprises at least one light source (29), at least one reflector (30), and at least one lens (27), and the at least one optical structure (1) is arranged on the lens (27) and/or is formed as an additional optics element (31).

22. The lighting device according to claim 20, wherein the lighting device (2) is a reflection system, which lighting device (2) comprises at least one free-form reflector (30) and at least one light source (29) and also at least one diffusing and/or at least one covering plate (26), and the at least one optical structure (1) is arranged on the at least one diffusing and/or the at least one covering plate (26) and/or is formed as an additional optics element (31).

23. A vehicle headlight comprising:
at least one lighting device comprising at least one optical structure (1),
wherein said at least one lighting device is configured to irradiate light in order to form a first unmodified light distribution (3) in a region in front of the lighting device (2),
wherein the optical structure (1) of the lighting device (2) is paired with or is part of the lighting device (2) such that at least part of an entire luminous flux of the lighting device (2) radiates through the optical structure (1),
wherein the first unmodified light distribution (3) generated by the lighting device (2) is modified by the optical structure (1) to provide a predefinable modified second light distribution (4),
wherein the optical structure (1) comprises two, three, or more optical structural elements (5, 5'), wherein each structural element (5, 5') has a light-scattering effect,
wherein a first proportion of the structural elements (5) is formed in such a way that beams (6) generated by the lighting device (2) and impinging on the first proportion of the structural elements (5) pass through the first proportion of the structural elements (5), and
wherein each beam (6) is refracted by the relevant structural element (5) to form a first exit beam (7), a second exit beam (8), and at least one further exit beam (9a).

* * * * *